M. ATMANCHUK.
CONVERTIBLE WHEEL.
APPLICATION FILED MAR. 7, 1919.
1,322,513.
Patented Nov. 25, 1919.
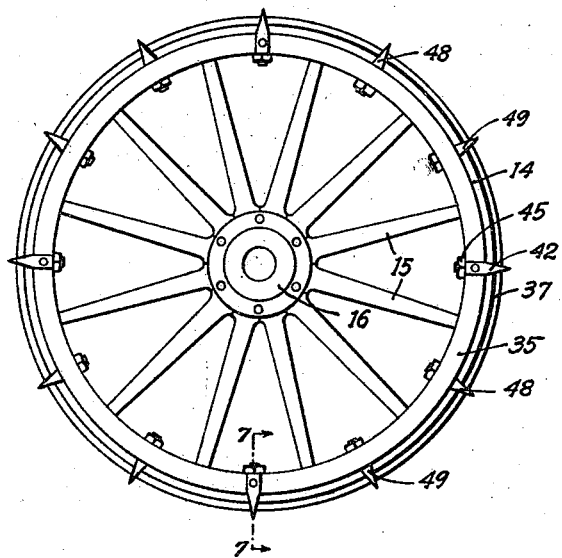
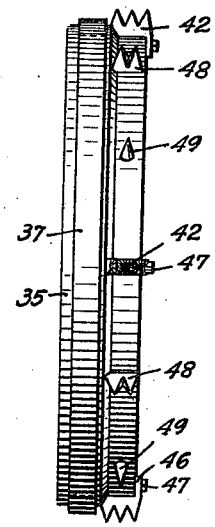
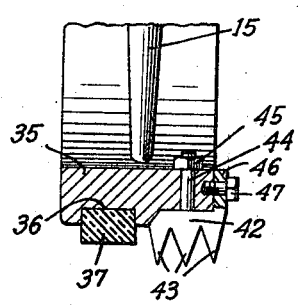
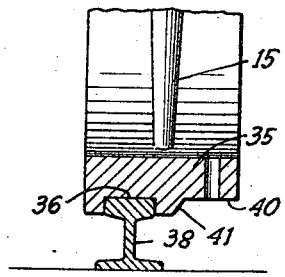
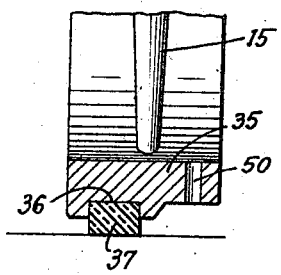
INVENTOR
Michal Atmanchuk.
BY
Frederick Myers
his ATTORNEY

UNITED STATES PATENT OFFICE.

MICHAL ATMANCHUK, OF SYRACUSE, NEW YORK.

CONVERTIBLE WHEEL.

1,322,513.  Specification of Letters Patent.  Patented Nov. 25, 1919.

Application filed March 7, 1919. Serial No. 281,212.

*To all whom it may concern:*

Be it known that I, MICHAL ATMANCHUK, a citizen of Ukraine, Russia, residing at Syracuse, county of Onondaga, and State of New York, have invented certain new and useful Improvements in Convertible Wheels, of which the following is a specification.

This invention relates to improvements in vehicle wheels and has as its special object the provision of means whereby the vehicle may be guided along a railway track or used as ordinarily upon the surface of a roadbed.

A further object is to provide means whereby the wheels, in following a curve, may move freely over the head of the rail, the guide elements being secured resiliently to the inner side of the wheel.

These and other like objects are attained by the novel construction and combination of parts hereinafter described and shown in the accompanying drawings, forming a material part of this disclosure, and in which—

Figure 1 is a side elevational view showing a modified form of wheel construction.

Fig. 2 is a front view of the same.

Fig. 3 is an enlarged fragmentary transverse sectional view taken on line 7—7 of Fig. 5.

Fig. 4 is a similar view of the same, the spur elements being disengaged, and the wheel shown in contact with a rail, and Fig. 5 is another similar view showing the angular recess in the periphery of the wheel filled with an elastic band, acting as a tread element, the spurs being removed from the wheel.

In Figs. 1 to 5, a rigid rim 35 is used with which are engaged the outer ends of the spokes 15, the rim having a peripheral groove 36 in which may be contained a tread or contacting element 37, the same being preferably made of rubber or other flexible material adapted to engage with the surface over which the vehicle travels, but which is capable of being removed so that the head of a rail 38 may enter the recess, guiding the wheel in an obvious manner.

The rim is formed with an exterior face 40, of the same diameter as the bottom of the recess 36 and having a beveled portion 41, the same being inclined outwardly, and adapted to have engaged therewith the corresponding beveled edge of spur elements 42, the same having three points 43, and engaged with the rim tie by stems 44 held in position by nuts 45. These spur elements are pressed toward the beveled element 41 by lugs 46 formed with them, through which are openings receptive of the clamp screws 47.

Interposed between the spur elements 42 are other spur elements 48, having two projecting spur points and intermediate between the spur elements 42 and 48 are single spur elements 49, engageable within the openings 50, formed radially through the extending portion of the rim, thereby forming a continuous procession of spur elements varying in their number of contact points and affording means whereby the wheel, when rotated, is caused to propel the vehicle in an obvious manner.

Having thus described my invention, what I claim as new and desire to secure by Letters Patent, is—

In a convertible wheel having a removable tire, the combination with a rim, having a plurality of radial openings extending therethrough, of spurs engageable on said rim, stems formed with said points adapted to pass through the mentioned openings, and means for securing said stems in position, said spurs having a variable number of points around the circumference of the wheel.

In testimony whereof I have affixed my signature.

MICHAL ATMANCHUK.